United States Patent

Imahori et al.

[11] 4,276,047
[45] Jun. 30, 1981

[54] ANTHRAQUINONE REACTIVE DYES FOR CELLULOSE-CONTAINING FIBERS

[75] Inventors: Seiichi Imahori, Kawasaki; Toshio Hihara, Sagamihara; Tomio Yomeyama; Takao Hirota, both of Kawasaki, all of Japan

[73] Assignee: Mitsubishi Chemical Industries Limited, Tokyo, Japan

[21] Appl. No.: 141,375

[22] Filed: Apr. 18, 1980

[30] Foreign Application Priority Data

May 14, 1979 [JP] Japan ................................. 54-58970

[51] Int. Cl.$^3$ ............................................. D06P 3/82
[52] U.S. Cl. .......................................... 8/532; 8/549; 8/918; 8/922; 544/188; 544/189
[58] Field of Search ................... 544/188, 189; 8/549, 8/532

[56] References Cited

U.S. PATENT DOCUMENTS

| 3,558,620 | 1/1971 | Bien et al. | 544/189 |
| 3,558,621 | 1/1971 | Bien et al. | 544/189 |
| 3,945,989 | 3/1976 | Angliker et al. | 260/153 |
| 3,974,160 | 8/1976 | Seiler et al. | 544/187 |
| 4,049,661 | 9/1977 | Seiler et al. | 544/294 |
| 4,052,386 | 10/1977 | Bein et al. | 544/322 |

FOREIGN PATENT DOCUMENTS 1177437  1/1970  United Kingdom .
2015584  9/1979  United Kingdom .
1554529 10/1979  United Kingdom .

Primary Examiner—A. Lionel Clingman
Attorney, Agent, or Firm—Bierman & Bierman

[57] ABSTRACT

An anthraquinone dye for direct printing and pad dyeing of cellulose-containing fibers and of the formula:

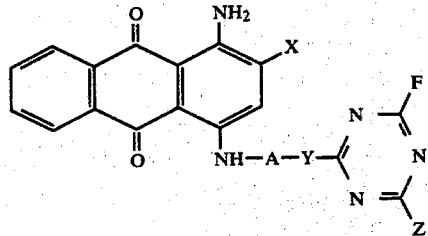

wherein A represents a phenylene group, Y represents a group —NH— or —$C_2H_4O$—, X represents a carbamoyl group which may be substituted with a lower alkyl group or a lower alkoxy-lower alkyl group, a sulfamoyl group which may be substituted with a lower alkyl group or a lower alkoxy-lower alkyl group, a halogen atom or a cyano group, and Z represents an amino group, a mono- or di-alkylamino group having 1–6 carbon atoms in total, an anilino group, a lower alkoxy group or a group —O($R^1$O)$_n$-$R^2$ in which $R^1$ represents an ethylene group or a propylene group, $R^2$ represents a methyl group or an ethyl group and n is an integer of 1–5.

2 Claims, No Drawings

ANTHRAQUINONE REACTIVE DYES FOR CELLULOSE-CONTAINING FIBERS

BACKGROUND OF THE INVENTION

The present invention relates to anthraquinone dyes for cellulose-containing fibers. More particularly, it relates to reactive anthraquinone dyes for direct printing and pad dyeing of cellulose-containing fibers, particularly cellulose fibers or mixed fibers of polyester fibers and cellulose fibers, fast blue in color.

SUMMARY OF THE INVENTION

It is an object of the present invention to provide novel anthraquinione dyes for direct printing and pad dyeing of cellulose-containing fibers.

The dyes in accordance with the present invention are water-insoluble reactive anthraquinone dyes of the formula (I):

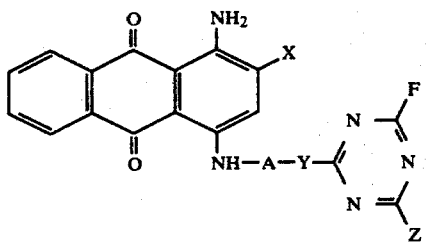
(I)

wherein A represents a phenylene group, Y represents a group —NH— or —C$_2$H$_4$O—, X represents a carbamoyl group which may be substituted with a lower alkyl group or a lower alkoxy-lower alkyl group, a sulfamoyl group which may be substituted with a lower alkyl group or a lower alkoxy-lower alkyl group, a halogen atom or a cyano group, and Z represents an amino group, a mono- or di-alkylamino group having 1-6 carbon atoms in total, an anilino group, a lower alkoxy group or a group —O(R$^1$O)$_n$-R$^2$ in which R$^1$ represents an ethylene group or a propylene group, R$^2$ represents a methyl group or an ethyl group and n is an integer of 1-5.

DETAILED DESCRIPTION OF THE INVENTION

The dyes of the formula (I) above can be produced by, for example, reacting a 1,4-diaminoanthraquinone of the formula (II):

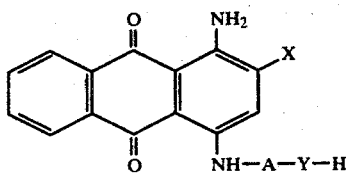
(II)

wherein A, X and Y are as defined in the formula (I) and a difluorotrazine of the formula (III):

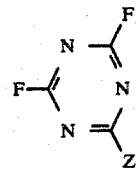
(III)

wherein Z is as defined in the formula (I) in a solvent such as acetone, dioxane, N-methylpyrrolidone or the like in the presence of an acid binding agent such as triethylamine, sodium carbonate or the like at room temperature for 2-10 hours.

The halogen atom represented by X in the formula (I) includes a chlorine atom, a bromine atom, etc., the substituted carbamoyl group represented by X includes a mono- or di-lower alkylcarbamoyl group such as a mono- or di-methylcarbamoyl group, ethylcarbamoyl group, propylcarbamoyl group, etc., and a mono- or di-lower aklkoxy-lower alkylcarbamoyl group such as a mono- or di-methoxypropylcarbamoyl group, isopropoxypropylcarbamoyl group, etc., and the substituted sulfamoyl group represented by X includes a mono- or di-lower alkylsulfamoyl group such as a mono- or di-methylsulfamoyl group, ethylsulfamoyl group, propylsulfamoyl group, etc., and a mono- or di-lower alkoxy-lower alkylsulfamoyl group such as a mono- or di-methoxypropylsulfamoyl group, isopropoxypropylsulfamoyl group, etc. The mono- or di-alkylamino group having 1-6 carbon atoms and represented by Z includes a methylamino group, an ethylamino group, a dimethylamino group, a diethylamino group, a straight-chain or branched-chain propylamino group, butylamino group, pentylamino group and hexylamino group, a dipropylamino group, etc.

The cellulose-containing fibers to be dyed with the dye of the invention are natural fibers such as of cotton, hemp, etc., semi-synthetic fibers such as viscose rayon, cuprammonium rayon, etc., and partially aminated or partially acylated, modified cellulose fibers. As a matter of course, these fibers may be in the form of woven or non-woven fabrics. Furthermore, mixed fibers or blended fiber fabrics which are made of the above-mentioned fibers and other types of fibers such as polyester fiber, cation-dyeable polyester fiber, anion-dyeable polyester fiber, urethane fiber, di- or triacetate fiber, etc., are usable. Of these, the cellulose fibers and the mixed fibers or mixed fiber fabrics of cellulose fibers and polyester fibers are more effective for application of the dye of the invention.

The cellulose-containing fibers are dyed with the dye of the invention preferably by the pad dyeing or the print dyeing.

In the pad dyeing and print dyeing of cellulose fibers, it has heretofore been generally practiced to employ direct dyes, sulfur dyes, vat dyes, napthol dyes, water-soluble reactive dyes and the like dyes. However, all of the first four dyes have problems in wet color fastness and color fastness to rubbing since they are not deposited by cobalent bonds with cellulose fibers. This is why water-soluble reactive dyes have been prominently used in practice. However, the water-soluble reactive dyes are known to involve the following problems.

1. The percentage of utilization of dye is as low as about 50-70%.

2. In order to develop good wet color fastness which is inherent to the water-soluble reactive dyes, the unreacted dye has to be completely removed from the fibers, thus requiring large amounts of water in the washing step. This is inevitably accompanied by an additional treatment of colored waste liquor.

On the other hand, in the pad dyeing and print dyeing of mixed materials composed of polyester fibers and cellulose fibers which are completely different in hydrophilic nature, the polyester fiber are dyed with disperse dyes and the cellulose fibers are dyed with the afore-mentioned various types of dyes. From a viewpoint of improved wet color fastness and color fastness to rubbing of the dyed articles, combinations of disperse dyes and water-soluble reactive dyes are widely used. Recently, intensive attention has been directed to a one-bath one-stage pad dyeing process and a one-phase printing process from an economical point of view. However, these dyeing processes are known to present the following problems.

1. About 2% by weight of an alkali, e.g. sodium carbonate, is usually added to a padding bath or a printing colored paste as a catalyst for reaction of the water-soluble reactive dye, and it causes the decomposition of the disperse dye upon thermal fixing, thus lowering the dyeing intensity or yellowing the cellulose to render the color shade dull.

2. Since the water-soluble reactive dye which has been deposited on polyester fibers is not utilized, the rate of utilization of the reactive dye becomes lower than that in the case where cellulose fibers alone are dyed. Thus, an excess of the water-soluble reactive dye must be used.

3. In order to completely remove from fibers and the unreacted water-soluble reactive dye and the non-fixed disperse dye which are factors of lowering color fasteness to light and wet color fastness of dyed articles, it goes without saying that a large amount of washing is necessary. When washed, the non-fixed disperse dye which has once removed from the fibers acts to stain the cellulose fibers or portions which are desired to remain as white spots.

Further, there are known methods of dyeing these mixed materials with a single dye. One of the methods is known as a so-called pigment resin process in which a pigment is deposited on fibers by means of a resin. However, this process presents problems with respect to texture and color fastness to rubbing of dyed articles. Another process is also known in which a nonionic dye of a specific type which is slightly greater in molecular weight than ordinary disperse dyes for polyester fibers is used. This dye is deposited on cellulose fibers in adsorbed state, so that when it is allowed to stand over long time, the bleeding phenomenon takes place. Because of the greater molecular weight than those of ordinary disperse dyes, the dye shows a great temperature dependency upon fixing and is low in reproducibility.

These prior art problems can be solved using the dye represented by the formula (I) of the invention.

In order to carry out the dyeing, the dye of the formula (I) is preferably finely dispersed in a medium in a particle size ranging from about 0.5-2 microns. There are a variety of methods which can be applied for this purpose, for example, a method in which the dye is finely dispersed in water by the use of a nonionic or anionic dispersant such as, for example, sodium ligninsulfonate or a water-soluble dispersant such as a sodium salt of naphthalenesulfonic acid-formalin condensate in a powdering machine such as a sand grinder, a mill or the like, a method of finely dispersing the dye by the use of a water-sparingly-soluble or insoluble dispersant such as compounds of sulfosuccinate, nonylphenol, etc., which are addition reacted with small moles of ethylene oxide in a solvent other than water, e.g. alcohols such as ethyl alcohol, isopropyl alcohol, polyethylene glycol, etc., ketones such as acetone, methyl ethyl ketone, etc., hydrocarbons such as n-hexane, toluene, xylene, mineral turpentine, etc., halogenated hydrocarbons such as tetrachloroethylene, etc., esters such as ethyl acetate, butyl acetate, etc., ethers such as dioxane, tetraethylene glycol dimethyl ether, etc., or mixed solvents thereof, and a method of finely dispersing the dye in a mixed solvent of water and a solvent chosen from the above-mentioned solvents and freely miscible with water.

In the afore-mentioned finely dispersing process, high molecular weight compounds soluble in the dispersing media or surface active agents having other main functions than the dispersing action may be added.

Although this dispersion of the finely dispersed dye may be employed as such as a padding bath for the padding process or as a printing colored paste for the printing process, the dye dispersion is usually diluted, for use as the padding bath and the printing colored paste, with water or a mixed system of water and a solvent freely miscible with water, or with an oil-in-water or water-in-oil type emulsion in which the oil phase is composed of a petroleum hydrocarbon such as a mineral turpentine, etc., or a halogenated hydrocarbon such as tetrachloroethylene, etc., in such ratio that a desired concentration of the dye is attained.

In order to conveniently prepare the padding bath or the printing colored paste using the dye in accordance with the present invention, a swelling agent for cellulose fibers or an acid binder such as alkali metal carbonate for the purpose of accelerating the reaction between the dye and cellulose fibers may be added. Further, in order to prevent the dye migration at the time of the pad dyeing or to control the viscosity of the colored paste, a thickening agent, e.g. water soluble polymers such as sodium alginate, may be added.

It is not always necessary that the swelling agent for cellulose fiber or the acid binder be present in the padding bath or the printing colored paste, and they may be affixed to fibers in advance.

The swelling agent for cellulose fibers may be any substance having a boiling point of 150° C. or higher and an effect of swelling the cellulose fibers, and includes, for example, ureas such as N,N,N'N'-tetramethylurea, etc., polyhydric alcohols such as polyethylene glycol, polypropylene glycol, etc. and their derivatives. Of these, the derivatives of the polyhydric alcohols, e.g. polyethylene glycol, polypropylene glycol and the like alcohols with an average molecular weight of about 200–500 the terminal hydroxyl groups of which are blocked at both ends by the methylation or acetylation and hence will not react with the reactive groups of the dye are preferred as the swelling agent. The amount of the swelling agent is suitably in the range of about 5–25% by weight, preferably about 8–15% by weight, of the padding bath or the printing colored paste.

The acid binder includes, in addition to the alkali metal carbonates mentioned above, alkali metal bicarbonates, alkali metal phosphates, alkali metal borates, alkali metal silicates, alkali metal hydroxides, alkali metal salts of fatty acids such as alkali metal acetates, and alkaline precursor compounds such as sodium trichloroacetate, sodium acetoacetate, etc. which are able to generate an alkali when heated in the presence of water.

Advantageously, since the monofluorotriazinyl group, i.e. the reactive group of the dye in accordance with the present invention is very reactive as compared with a monochlorotriazinyl group, the amount of the acid binder used can be greatly reduced and the decomposition of the dye and the yellowing of the fibers at the time of dyeing can be prevented. The amount of the acid binder used is in the range of 0-0.1% by weight of the padding bath or the printing colored paste in the case of the monofluoromonoalkoxytriazinyl group and in the range of about 0.1-0.2% by weight in the case of the monofluoroaminotriazinyl group.

The afore-mentioned fibers can be dyed using the dyes in accordance with the present invention in any conventional manner. For example, a cellulose fiber containing material is impregnated or printed with the padding bath or the printing colored paste prepared as described above, dried, heat treated with hot air or superheated steam of 160°-220° C. for a period ranging from 30 seconds to 10 minutes, or treated in saturated stream at elevated pressure at 120°-150° C. for 3-30 minutes, and finally washed with hot water containing a surface active agent or washed in an oil-in-water or water-in-oil type emulsion washing bath the oil phase of which is composed of a halogenated hydrocarbon such as tetrachloroethylene or the like, or washed by conventional dry cleaning methods.

The thus obtained article dyed as described above is clear and uniform in color and shows excellent color fastness to light and wet color fastness.

The present invention is more particularly described in the following examples, but it will be understood that the variations and modifications can be effected within the spirit and scope of the invention.

EXAMPLE 1

Fifteen grams of an anthraquinone dye of the structural formula below, 15 g of a naphthalenesulfonic acid-formaldehyde condensate and 70 ml of water were placed and finely dispersed in a paint shaker to prepare a dye dispersion:

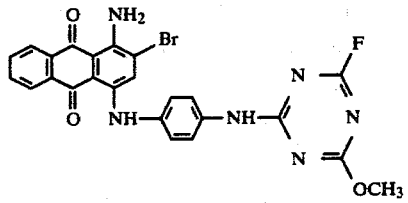

The thus prepared dye dispersion was used to prepare a printing colored paste of the following formulation:

| | |
|---|---|
| Dye dispersion | 6.5 g |
| 5% Sodium alginate aqueous solution | 55.0 g |
| Polyethylene glycol dimethyl ether (average molecular weight 400) | 9.0 g |
| Sodium carbonate | 0.05 g |
| Water | balance |
| | 100.0 g |

Then, a polyester/cotton (mixing ratio 65/35) mixed cloth was printed using a screen printing machine, followed by preliminarily drying at 80° C. for 3 minutes and dry fixing at 215° C. for 90 seconds. Thereafter, the cloth was washed with water and subjected to soaping with a washing liquid containing 1 g/l of sodium hydroxide and 2 g/l of a nonionic active agent (Scoural 900 (registered trademark) manufactured by Kao Soap Co., Ltd.) in a bath ratio of 1:30 for 20 minutes, thereby obtaining a blue-colored dye cloth showing excellent color fastness to light.

Part of the dye cloth was then treated with 70% sulfuric acid to dissolve away the cotton alone to obtain the polyester fibers while another part of the cloth was separately treated with hexafluoroisopropanol to dissolve away the polyester alone to obtain the cellulose fibers. The color shades of these fibers were compared with each other and it was found that the solid dyeing effect was very good and the color fastness to light of the respective dye fibers was also good.

The dye used in this Example was prepared by reacting 1-amino-2-bromo-4-(4'-aminoanilino)anthraquinone (40.8 g) with 2,4-difluoro-6-methoxy-s-triazine (22.1 g) in N-methylpyrrolidone solvent (200 ml) in the presence of triethylamine (10.1 g) at room temperature for 2 hours. The dye had a $\lambda_{max}$ (acetone) of 614 nm.

EXAMPLE 2

Fifteen grams of an anthraquinone dye of the structural formula below, 15 g of a naphthalenesulfonic acid - formaldehyde condensate and 70 ml of water were placed and finely dispersed in a sand grinder to prepare a dye dispersion:

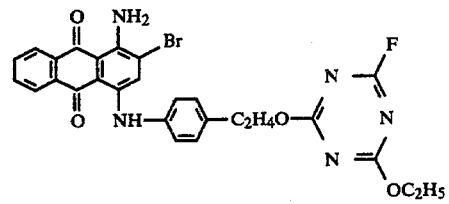

The dye dispersion was used to prepare a printing colored paste of the following formulation:

| | |
|---|---|
| Dye dispersion | 7.0 g |
| 5% Sodium alginate aqueous solution | 55.0 g |
| Propylene glycol diacetate (average molecular weight 300) | 12.0 g |
| Sodium carbonate | 0.05 g |
| Water | balance |
| | 100.0 g |

The paste was then printed on a mercerized cotton broad cloth (No. 40 count cotton) using a screen printing machine, followed by preliminarily drying at 80° C. for 3 minutes and treating with superheated steam of 185° C. for 7 minutes. Then, the washing treatment was conducted in the same manner as in Example 1 thereby obtaining a blue-colored dye cloth which showed excellent color fastness to light and wet color fastness.

The dye used in this example was prepared by reacting 1-amino-2-bromo-4-(4'-hydroxyethylanilino)anthraquinone (43.7 g) and 2,4-difluoro-6-ethoxy-s-triazine (24.2 g) in N-methylpyrrolidone solvent (220 ml) in the presence of triethylamine (10.1 g) at room temperature for 4 hours. The dye had a $\lambda_{max}$ (acetone) of 615 nm.

EXAMPLE 3

Ten grams of an anthraquinone dye of the structural formula below, 2 g of polyoxyethylene glycol nonyl phenyl ether (HLB 8.9) and 88 g of diethylene glycol diacetate were placed and milled in a paint conditioner to prepare a dye ink:

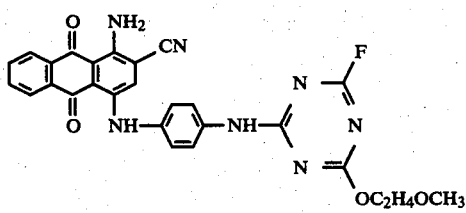

Ten grams of the dye ink and 55 g of mineral turpentine were mixed and the resulting mixture was gradually added to 35 g of an aqueous solution having the following formulation while agitating in a homogenizer and the stirring was continued until the mixture became uniform thereby obtaining a viscous oil-in-water type emulsion colored paste.

| Water | 31.0 g |
|---|---|
| Repitol G | |
| (registered trademark, manufactured by | |
| Daiichi Industrial Chemicals Co., Ltd., | |
| Special nonionic surfactant) | 3.8 g |
| Sodium trichloroacetate | 0.2 g |
| | 35.0 g |

The obtained colored paste was used to print a polyester/cotton (mixing ratio 65/35) blended cloth using a screen printing machine, dried at 100° C. for 2 minutes, and treated with superheated steam at 175° C. for 7 minutes. Thereafter, the printed cloth was washed in a hot tetrachloroethylene bath containing a small amount of water and dried to obtain a greenish blue-colored dye cloth which had excellent wet color fastness and was free from staining in the white area.

The dye used in this example was prepared by reacting 1-amino-2-cyano-4-(4'-aminoanilino)anthraquinone (35.4 g) with 2,4-difluoro-6-methoxyethoxy-s-triazine (28.7 g) in N-methylpyrrolidone solvent (180 ml) in the presence of triethylamine (10.1 g) at room temperature for 2 hours. The dye had a $\lambda_{max}$ (acetone) of 637 nm.

EXAMPLE 4

Sixteen grams of an anthraquinone dye of the structural formula below, 10 g of polyoxyethylene glycol nonyl phenyl ether (HLB 13.3) and 74 g of water were placed and finely dispersed in a sand grinder to obtain a dye dispersion:

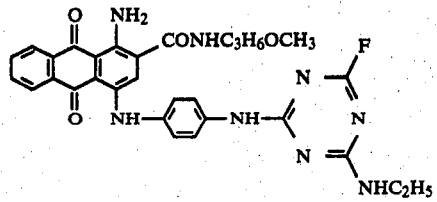

The dye dispersion was used to prepare a padding bath of the following formulation:

| Dye dispersion | 6.0 g |
|---|---|
| Tetraethylene glycol dimethyl ether | 15.0 g |
| Sodium trichloroacetate | 0.2 g |
| Water | balance |
| | 100.0 g |

Then, a polyester/rayon (mixing ratio 65/35) blended cloth was dipped in the bath and squeezing at a squeezing ratio of 75%, followed by drying at 100° C. for 2 minutes and dry fixing at 200° C. for one minute. The thus treated cloth was washed in a hot ethanol bath to obtain a greenish blue-colored dye cloth which was evenly dyed and had excellent wet color fastness.

The dye used in this example was prepared by reacting 1-amino-2-(N-γ-methoxypropyl)carbamoyl-4-(4'-aminoanilino)anthraquinone (44.4 g) with 2,4-difluoro-6-ethylamino-s-triazine (24.0 g) in N-methylpyrrolidone solvent (220 ml) in the presence of triethylamine (10.1 g) at room temperature for 2 hours. The dye had a $\lambda_{max}$ (acetone) of 627 nm.

EXAMPLE 5

The procedures in Example 1 were repeated except that the cloth was replaced by a nylon/rayon (mixing ratio 50/50) blended cloth and the dry fixing temperature was changed to 185° C., thereby obtaining a blue-colored printed cloth which showed good wet color fastness. The microscopic observation revealed that the printed cloth was dyed uniformly.

EXAMPLE 6

The anthraquinone dyes indicated in the following Table were used to print polyester/cotton fibers in accordance with the procedures in Example 1 employing as an acid binding agent sodium carbonate in an amount of 0.05% by weight of the printing paste in the case where the reactive group was a monofluoromonoalkoxytriazinyl group or sodium carbonate in an amount of 0.2% by weight of the printing paste in the case where the reactive group was a monofluoromonoaminotriazinyl group.

The color shades of the obtained dyed cloths and the λmax's (acetone) of the employed anthraquinone compounds are given in the Table.

TABLE 1

Dye structure: 1-amino-4-(NH-A-Y-triazinyl)anthraquinone with X substituent; triazine has F and Z substituents

| −A− | −X | −Y− | −Z | Color shade of dyed cloth (Polyester/cotton) | $\lambda_{max}$ of dye (aceton) nm |
|---|---|---|---|---|---|
| para-phenylene | −Cl | −NH− | −OCH₃ | Blue | 610 |
| " | −Br | " | −OC₂H₄OCH₃ | " | 613 |
| " | " | " | −O(C₂H₄O)₂CH₃ | " | 613 |
| " | " | " | −NHC₆H₁₃ (n) | " | 614 |
| " | −CN | " | −OC₂H₅ | Greenish blue | 636 |
| " | " | " | −NH−C₆H₅ | " | 638 |
| " | −CONH₂ | −NH− | −OC₂H₄OCH₃ | " | 629 |
| " | " | " | −NHC₅H₁₁ (n) | " | 629 |
| " | −CON(C₂H₅)₂ | " | −OC₄H₉ (n) | " | 627 |
| " | −CONHC₃H₇ (n) | " | −OC₂H₄OCH₃ | " | 628 |
| " | −CONHC₃H₆OC₃H₇ (iso) | " | −OCH₃ | " | 626 |
| " | −SO₂NH₂ | " | −O(C₃H₆O)₂CH₃ | " | 631 |
| " | −SO₂NHCH₃ | " | −N(C₃H₇(n))₂ | " | 630 |
| " | −SO₂NHC₃H₆OC₃H₇ (iso) | " | −OC₂H₅ | " | 629 |
| meta-tolylene | −Cl | −NH− | −NHC₅H₁₁ (n) | Blue | 607 |
| " | −Br | " | −OC₄H₉ (iso) | " | 609 |
| " | " | " | −NHC₂H₅ | " | 610 |
| " | −CN | " | −O(C₃H₆O)₄CH₃ | Greenish blue | 634 |
| " | " | " | −NHC₆H₁₃ (n) | " | 635 |
| " | −CONHCH₃ | " | −NH−C₆H₅ | " | 624 |
| ortho-xylylene | −Br | " | −OC₂H₄OCH₃ | Blue | 614 |
| " | −CN | " | −OC₄H₉ (n) | Greenish blue | 637 |
| para-phenylene | −Cl | −C₂H₄O− | −OC₂H₄OCH₃ | Blue | 610 |
| " | −Br | " | −OCH₃ | " | 615 |
| " | " | " | −OC₂H₄OCH₃ | " | 614 |
| " | " | " | −NHCH₃ | " | 614 |
| " | " | " | −NHC₃H₇ (n) | " | 615 |
| " | " | " | −N(C₂H₅)₂ | " | 616 |
| " | " | " | −NH−C₆H₅ | " | 616 |
| " | " | " | −NHC₆H₁₃ (n) | " | 616 |
| " | " | " | −N(C₃H₇(n))₂ | " | 616 |
| " | " | " | −NH₂ | " | 615 |
| " | −CN | " | −OC₂H₄OC₂H₅ | Greenish blue | 635 |
| " | " | " | −O(C₂H₄O)₅CH₃ | " | 635 |
| " | " | " | −NHC₄H₉ (iso) | " | 636 |
| " | " | " | −NHC₆H₁₃ (n) | " | 636 |
| " | " | " | −NH−C₆H₅ | " | 636 |
| " | " | " | −N(C₃H₇(n))₂ | " | 636 |
| " | −CONHCH₃ | " | −OC₂H₄OCH₃ | Greenish blue | 625 |
| " | −CONHC₃H₆OCH₃ | " | " | " | 624 |
| " | " | " | −NHC₅H₁₁ (n) | " | 624 |
| " | −SO₂NHC₃H₇ (n) | " | −OC₂H₄OCH₃ | " | 630 |
| " | −SO₂N(C₂H₅)₂ | " | −OC₃H₇ (n) | " | 629 |
| " | −SO₂NHC₃H₆OCH₃ | " | −N(CH₃)₂ | " | 629 |

What is claimed is:

1. A dye of the formula

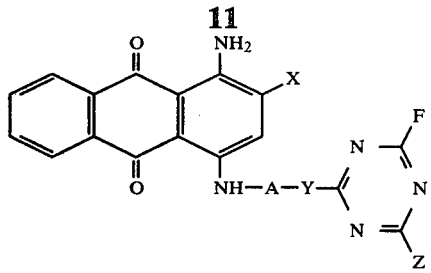

wherein A represents a phenylene group, Y represents a group —NH— or —C$_2$H$_4$O—, X represents a carbamoyl group which may be substituted with a lower alkyl group or a lower alkoxy-lower alkyl group, a sulfamoyl group which may be substituted with a lower alkyl group or a lower alkoxy-lower alkyl group; a halogen atom or a cyano group, and z represents an amino group, a mono- or di-alkylamino group having 1–6 carbon atoms in total, an anilino group, a lower alkoxy group or a group —O(R$^1$O)$_n$—R$^2$ in which R$^1$ represents an ethylene group or a propylene group, R$^2$ represents a methyl group or an ethyl group and n is an integer of 1–5.

2. A method of direct printing or pad dyeing of a mixture of cellulose fibers and polyester fibers comprising applying a compound of claim 1 to said mixture.

* * * * *